(12) United States Patent
Namba

(10) Patent No.: US 9,704,669 B2
(45) Date of Patent: Jul. 11, 2017

(54) KEY INPUT DEVICE FOR MULTIFUNCTION PERIPHERAL EQUIPMENT

(71) Applicant: Brother Kogyo Kabushiki Kaisha, Nagoya-shi, Aichi-ken (JP)

(72) Inventor: Mamoru Namba, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/085,462

(22) Filed: Mar. 30, 2016

(65) Prior Publication Data

US 2016/0293355 A1    Oct. 6, 2016

(30) Foreign Application Priority Data

Mar. 31, 2015 (JP) ................. 2015-074343

(51) Int. Cl.
| | |
|---|---|
| *H01H 9/26* | (2006.01) |
| *H01H 13/702* | (2006.01) |
| *H01H 13/88* | (2006.01) |
| *H04N 1/00* | (2006.01) |
| *H01H 13/7057* | (2006.01) |
| *G06F 3/02* | (2006.01) |

(52) U.S. Cl.
CPC ............ *H01H 13/702* (2013.01); *G06F 3/02* (2013.01); *H01H 13/7057* (2013.01); *H01H 13/88* (2013.01); *H04N 1/00384* (2013.01); *H01H 2221/044* (2013.01); *H01H 2221/05* (2013.01); *H01H 2233/034* (2013.01); *H01H 2233/054* (2013.01); *H01H 2233/056* (2013.01); *H01H 2239/004* (2013.01); *H04N 1/00411* (2013.01); *H04N 2201/0094* (2013.01)

(58) Field of Classification Search
CPC .......................... H01H 13/70; H01H 13/7006
USPC ..................... 200/5 A, 341, 275; 399/81, 84; 361/679.01
See application file for complete search history.

(56) References Cited

U.S. PATENT DOCUMENTS 3,705,276 A * 12/1972 Seeger, Jr. ............ H01H 1/029
                                                    200/16 A
3,909,564 A *  9/1975 Scheingold .......... H01H 13/705
                                                    200/292

(Continued)

FOREIGN PATENT DOCUMENTS

| JP | 4473538 B2 | 6/2010 |
|---|---|---|
| JP | 4512346 B2 | 7/2010 |

(Continued)

*Primary Examiner* — Vanessa Girardi
(74) *Attorney, Agent, or Firm* — Banner & Witcoff, Ltd.

(57) ABSTRACT

A key input device includes: keys each including a contact portion provided on its back surface; a holder holding the keys movably; a conductive member opposed to the holder; and a circuit board having a switch surface and switches arranged on the switch surface and each contactable with the contact portion of a corresponding key. The conductive member is interposed between the switch surface and the holder. The holder has first through holes, and the conductive member has second through holes. At least one of the contact portion and the switch is inserted in a corresponding one of the first through holes, and at least one of the contact portion and the switch is inserted in a corresponding one of the second through holes.

13 Claims, 7 Drawing Sheets

(56) References Cited

U.S. PATENT DOCUMENTS

| | | | | |
|---|---|---|---|---|
| 3,999,025 | A | * | 12/1976 | Sims, Jr. .............. H01H 13/705 |
| | | | | 200/5 A |
| 8,283,582 | B2 | * | 10/2012 | Chen .................... H01H 13/703 |
| | | | | 200/5 A |
| 2004/0200712 | A1 | | 10/2004 | Nishimura et al. |
| 2008/0164132 | A1 | * | 7/2008 | Yoo ........................ H01H 13/83 |
| | | | | 200/5 A |
| 2012/0018288 | A1 | * | 1/2012 | Rollet .................... G06F 21/83 |
| | | | | 200/5 A |

FOREIGN PATENT DOCUMENTS

| | | |
|---|---|---|
| JP | 2015-000530 A | 1/2015 |
| JP | 2015-006075 A | 1/2015 |

\* cited by examiner

KEY INPUT DEVICE FOR MULTIFUNCTION PERIPHERAL EQUIPMENT

CROSS REFERENCE TO RELATED APPLICATION

The present application claims priority from Japanese Patent Application No. 2015-074343, which was filed on Mar. 31, 2015, the disclosure of which is herein incorporated by reference in its entirety.

BACKGROUND

Technical Field

The following disclosure relates to a key input device that is an assembly including a plurality of keys and capable of outputting a signal corresponding to a pressed one of the keys, to a method of manufacturing the key input device, and to an image recording apparatus.

Description of the Related Art

Various devices include a key input device as a user interface. Image recording apparatuses such as ink-jet recording apparatuses and copying machines generally include a user interface provided on a front and upper portion of a body of the apparatus, and the user interface includes a key input device having a plurality of keys, for example. A surface member of such a user interface has a plurality of key holes through which key tops of the respective keys are exposed. The surface member of the user interface is generally formed of a light resin having a good workability, such as polystyrene (PS).

SUMMARY

In the user interface of the conventional image recording apparatuses, as described above, the key input device is covered with the surface member having the key holes corresponding to the keys, so that only the keys of the key input device are exposed to an outside of the image recording apparatus. In such a user interface, a layout of the keys is limited in some cases by the workability of the surface member. For example, in the case where the surface member has the key holes corresponding to the keys of the numeric keypad, the distance between the key holes cannot be made extremely short from the viewpoint of the mechanical strength of the surface member. Thus, even in the case where the keys are preferably arranged at a considerably short distance (e.g., a distance less than or equal to 0.51 mm) from the viewpoint of design, it may be difficult to provide a desired design because the distance between the key holes cannot be made extremely short.

Furthermore, various kinds of devices are expected to use the key input device in various climates. Because users contact the key input device directly, the key input device is desired to have enough mechanical strength and safety. Also, the key input device is desired to have enough resistance to destruction of circuit components of the key input device due to static electricity.

Accordingly, an aspect of the disclosure relates to a key input device, a method of manufacturing the key input device, an image recording apparatus, each capable of eliminating limitations to designs due to external factors such as mechanical strength of a surface member of the user interface and improving (i) mountability of the key input device on a device using the key input device as a user interface and (ii) resistance to electrostatic destruction of circuit components of the key input device.

In one aspect of the disclosure, a key input device includes: a plurality of keys each having (i) a pressing surface, (ii) a back surface located on an opposite side of said each of the plurality of keys from the pressing surface, and (iii) a contact portion provided on the back surface; a holder having a sheet shape and including an urging member configured to urge at least one of the plurality of keys in a fourth direction that is opposite to a third direction directed from the pressing surface toward the back surface, the holder having a first surface and a second surface located on an opposite side of the holder from the first surface, the holder holding the plurality of keys, such that the plurality of keys are movable in the third direction and the fourth direction, in a state in which the plurality of keys are arranged on the first surface in at least one of a first direction parallel with the first surface and a second direction parallel with the first surface and intersecting the first direction; a conductive member having a sheet shape and opposed to the second surface of the holder; and a circuit board having a switch surface and a plurality of switches arranged on the switch surface and each being a switch contactable with the contact portion of a corresponding one of the plurality of keys. The circuit board is disposed such that the conductive member is interposed between the switch surface and the second surface of the holder The holder has a plurality of first through holes, and the conductive member has a plurality of second through holes. At least one of the contact portion and the switch is inserted in a corresponding one first through hole of the plurality of first through holes, and at least one of the contact portion and the switch is inserted in a corresponding one second through hole of the plurality of second through holes.

Another aspect of the disclosure is a method of manufacturing a key input device. The key input device includes: a plurality of keys each having (i) a pressing surface, (ii) a back surface located on an opposite side of said each of the plurality of keys from the pressing surface, and (iii) a contact portion provided on the back surface; a holder having a sheet shape and including an urging member configured to urge at least one of the plurality of keys in a fourth direction that is opposite to a third direction directed from the pressing surface toward the back surface, the holder having a first surface and a second surface located on an opposite side of the holder from the first surface, the holder holding the plurality of keys, such that the plurality of keys are movable in the third direction and the fourth direction, in a state in which the plurality of keys are arranged on the first surface in at least one of a first direction parallel with the first surface and a second direction parallel with the first surface and intersecting the first direction; a conductive member having a sheet shape and opposed to the second surface of the holder; and a circuit board having a switch surface and a plurality of switches arranged on the switch surface and each being a switch contactable with the contact portion of a corresponding one of the plurality of keys. The circuit board is disposed such that the conductive member is interposed between the switch surface and the second surface of the holder. The holder has a plurality of first through holes, and the conductive member has a plurality of second through holes. At least one of the contact portion and the switch is inserted in a corresponding one first through hole of the plurality of first through holes, and at least one of the contact portion and the switch is inserted in a corresponding one second through hole of the plurality of second through holes. The method of manufacturing the key input device includes recording an image on the pressing surface in a state in which the plurality of keys are held by the holder.

In another aspect of the disclosure, an image recording apparatus includes: a plurality of keys each having (i) a pressing surface, (ii) a back surface located on an opposite side of said each of the plurality of keys from the pressing surface, and (iii) a contact portion provided on the back surface; a holder having a sheet shape and including an urging member configured to urge at least one of the plurality of keys in a fourth direction that is opposite to a third direction directed from the pressing surface toward the back surface, the holder having a first surface and a second surface located on an opposite side of the holder from the first surface, the holder holding the plurality of keys, such that the plurality of keys are movable in the third direction and the fourth direction, in a state in which the plurality of keys are arranged on the first surface in at least one of a first direction parallel with the first surface and a second direction parallel with the first surface and intersecting the first direction; a conductive member having a sheet shape and opposed to the second surface of the holder; a circuit board having a switch surface and a plurality of switches arranged on the switch surface and each being a switch contactable with the contact portion of a corresponding one of the plurality of keys, the circuit board being disposed such that the conductive member is interposed between the switch surface and the second surface of the holder; and an image recorder configured to record an image on a sheet. The holder has a plurality of first through holes, and the conductive member has a plurality of second through holes. At least one of the contact portion and the switch is inserted in a corresponding one first through hole of the plurality of first through holes, and at least one of the contact portion and the switch is inserted in a corresponding one second through hole of the plurality of second through holes.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Figure 1A:
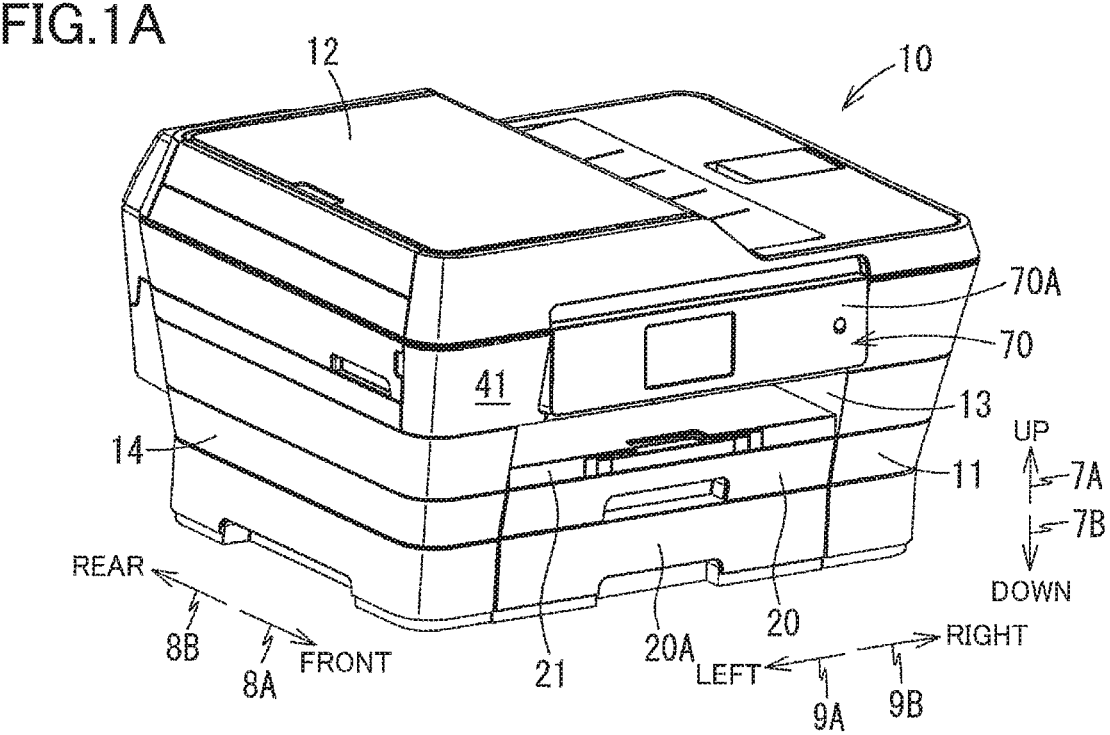
FIG. 1A is a perspective view of a multi-function peripheral (MFP) including a printer as one example of an image recording apparatus, with a panel located at a first position.
Figure 1B:
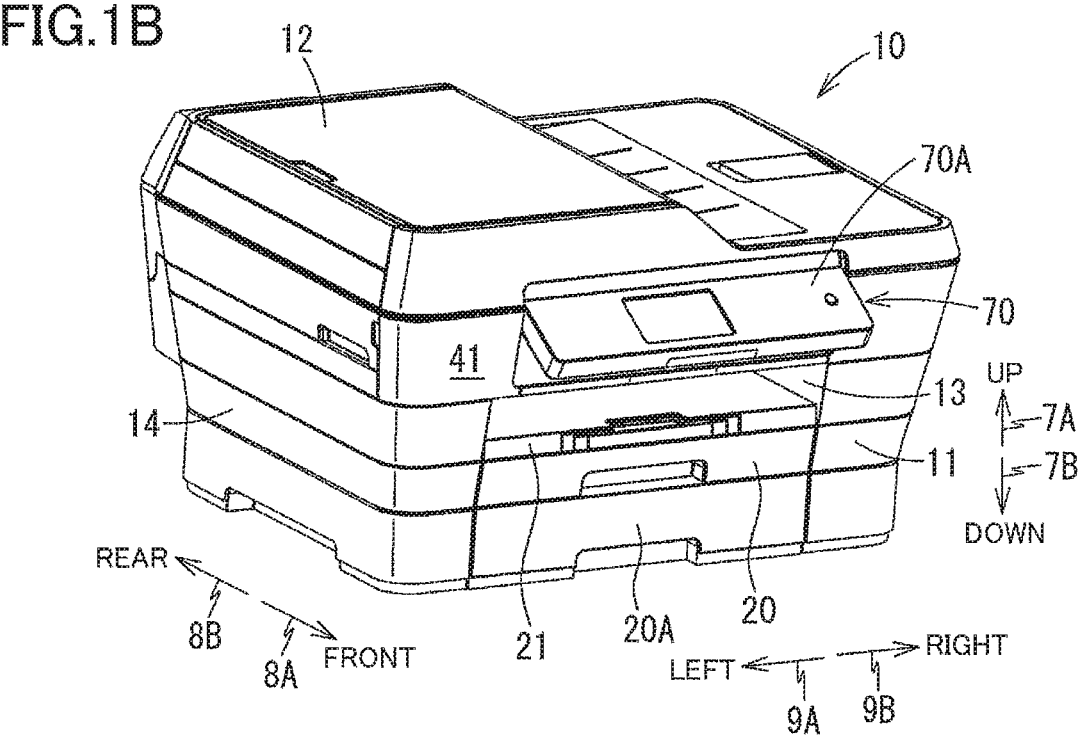
FIG. 1B is a perspective view of the MFP, with the panel located at a second position.

Hereinafter, there will be described one embodiment by reference to the drawings. It is to be understood that the following embodiment is described only by way of example, and the disclosure may be otherwise embodied with various modifications without departing from the scope and spirit of the disclosure. A multi-function peripheral (MFP) 10 is used in a state illustrated in FIG. 1. In the following explanation, up and down directions 7A, 7B are defined in this state. Also, front and rear directions 8A, 8B are defined by regarding a side of the MFP 10 on which an opening 13 is formed as a front side (a front surface 41), and left and right directions 9A, 9B are defined in a state in which the MFP 10 is viewed from the front. Also, for the explanation of components, the up and down directions 7A, 7B, the front and rear directions 8A, 8B, and the left and right directions 9A, 9B are defined based on a state in which the components are assembled to the MFP 10. For a panel 70 as a movable member, the up and down directions 7A, 7B, the front and rear directions 8A, 8B, and the left and right directions 9A, 9B are defined with respect to a first position illustrated in FIG. 1A.

Overall Construction of MFP 10

As illustrated in FIG. 1, the MFP 10 has a generally rectangular parallelepiped shape. The MFP 10 includes a scanner 12 at its upper portion. The scanner 12 obtains image data by controlling an image sensor to read an image formed on a document such as a recording sheet. The MFP 10 includes a printer 11 (as one example of an image recording apparatus) at its lower portion. The printer 11 records an image on a recording sheet 15 (see FIG. 2) based on image data such as the image data obtained by the scanner 12. The panel 70 is provided on an upper portion of the front surface 41 of a printer housing 14 of the printer 11. The panel 70 is a user interface of the MFP 10.

Scanner 12

The scanner 12 is a what is called a flatbed scanner in the present embodiment, but a detailed description of the internal structure of the scanner 12 is omitted.

Printer 11

The printer 11 has a generally rectangular parallelepiped shape and includes the printer housing 14 having the opening 13 on its front surface.

Sheet-Supply Tray 20 and Lower Sheet-supply Tray 20A

Figure 2:
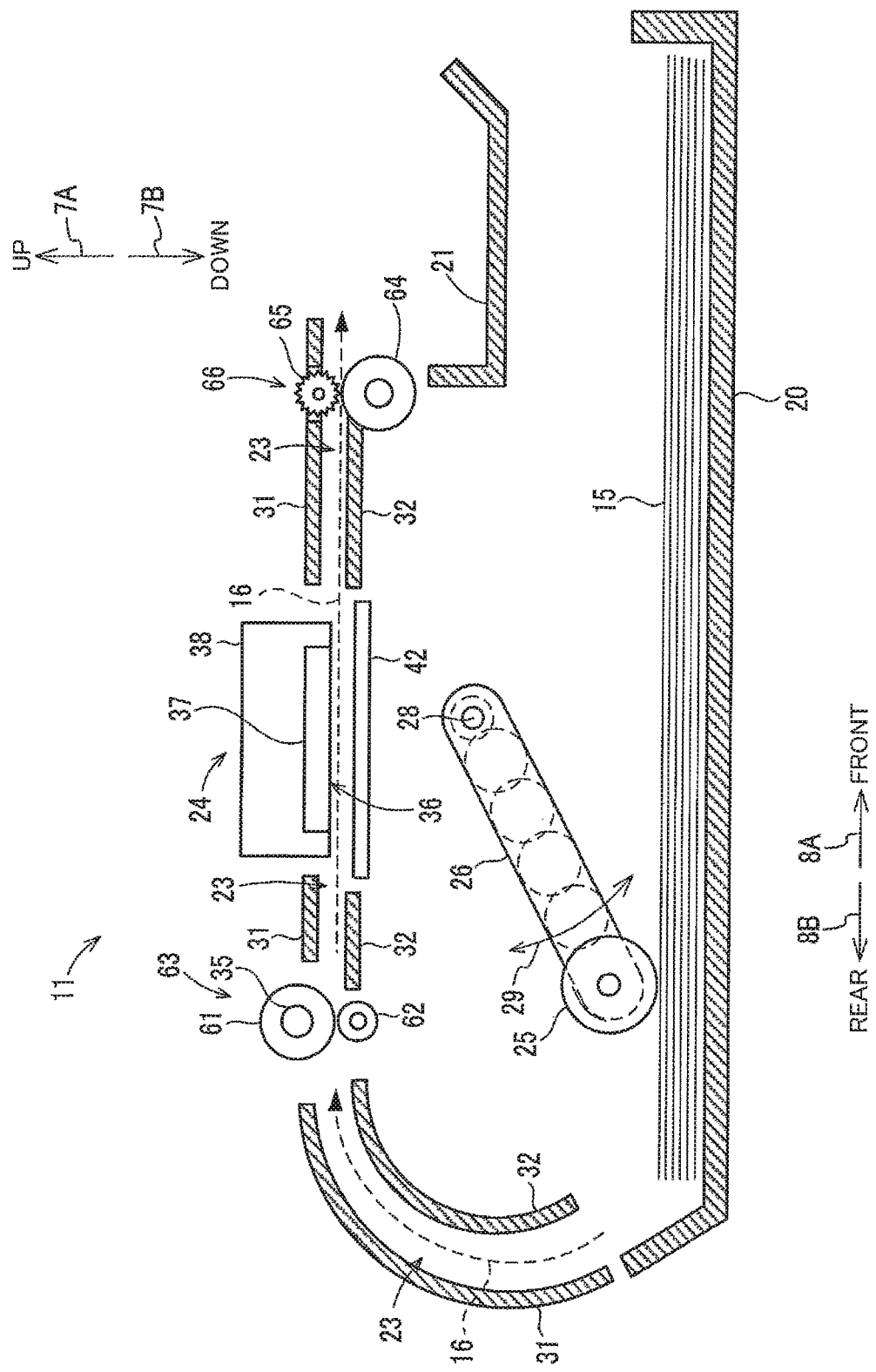
FIG. 2 is an elevational view in vertical cross section schematically illustrating an internal structure of the printer.

As illustrated in FIG. 2, the printer housing 14 of the printer 11 contains: a sheet-supply tray 20 insertable and removable through the opening 13 in the front and rear directions 8A, 8B and capable of storing a plurality of the recording sheets 15; a conveying roller pair 63 and a discharge roller pair 66 that convey the recording sheets 15 supplied from the sheet-supply tray 20 one by one along a conveyance path 23; and an image recorder 24 that records an image on the recording sheet 15 conveyed along the conveyance path 23, based on, e.g., the image data obtained from the document by the scanner 12.

A supply roller 25 is provided under the image recorder 24 and over the sheet-supply tray 20 mounted in the printer 11. The supply roller 25 is supported by a shaft at a distal end portion of a supply arm 26. The supply roller 25 is rotated by a driving force transmitted from a supply motor, not illustrated. The supply arm 26 is pivotable about a support shaft 28 provided on its basal end portion, in a direction indicated by an arrow 29. This construction enables the supply roller 25 to be moved to and away from the sheet-supply tray 20 or the recording sheet 15 supported on the sheet-supply tray 20. A lower sheet-supply tray 20A is provided under the sheet-supply tray 20 so as to be insertable into and removable from the printer housing 14 in the front and rear directions 8A, 8B. The construction of the lower sheet-supply tray 20A and conveyance of and image recording on the recording sheet 15 supplied from the lower sheet-supply tray 20A are similar to those in the case of the sheet-supply tray 20, and an explanation and illustration in FIG. 2 are dispensed with.

Sheet-Discharge Tray 21

The recording sheet 15 on which an image has been recorded is discharged onto a sheet-discharge tray 21 provided over the sheet-supply tray 20. Here, the sheet-discharge tray 21 is superposed on the sheet-supply tray 20 and inserted and removed through the opening 13 together with the sheet-supply tray 20. The sheet-discharge tray 21 defines a bottom of the opening 13 and located under the panel 70 in the state in which the sheet-supply tray 20 is inserted in the opening 13. That is, the recording sheet 15 on which an image has been recorded is discharged into the opening 13.

Conveyance Path 23

As illustrated in FIG. 2, the conveyance path 23 extends from a rear end portion of the sheet-supply tray 20 so as to make an upward U-turn and extends in the front direction 8A to the sheet-discharge tray 21. The conveyance path 23 is defined by a first guide member 31 and a second guide member 32 which are opposed to each other at a predetermined distance. The recording sheet 15 is conveyed through the conveyance path 23 in a conveying direction 16 indicated by broken-line arrows in FIG. 2.

Conveying Roller Pair 63 and Discharge Roller Pair 66

As illustrated in FIG. 2, the conveying roller pair 63 is provided on the conveyance path 23 at a position located upstream of the image recorder 24 in the conveying direction 16. The conveying roller pair 63 is constituted by a conveying roller 61 and a pinch roller 62. The pinch roller 62 is held in pressing contact with a rolling surface of the conveying roller 61 by elastic members, not illustrated, such as springs. The discharge roller pair 66 is provided on the conveyance path 23 at a position located downstream of the image recorder 24 in the conveying direction 16. The discharge roller pair 66 is constituted by a discharge roller 64 and a spur roller 65. The spur roller 65 is held in pressing contact with a rolling surface of the discharge roller 64 by elastic members, not illustrated, such as springs.

The conveying roller 61 and the discharge roller 64 are rotated by a driving force transmitted from a conveying motor, not illustrated. When receiving the driving force, each of the conveying roller 61 and the discharge roller 64 and a corresponding one of the pinch roller 62 and the spur roller 65 nip and convey the recording sheet 15 in the conveying direction 16.

Image Recorder 24

As illustrated in FIG. 2, the image recorder 24 is disposed over the conveyance path 23. A platen 42 is provided under the conveyance path 23 at a position opposed to the image recorder 24. An upper surface of the platen 42 supports the recording sheet 15 conveyed along the conveyance path 23. The image recorder 24 includes: a recording head 37 that can be opposed to the conveyance path 23; and a carriage 38 on which the recording head 37 mounted. The recording head 37 has a multiplicity of nozzles 36 through which the recording head 37 ejects ink supplied from ink cartridges, not illustrated, onto the recording sheet 15 conveyed along the conveyance path 23. The carriage 38 is reciprocable in the left and right directions 9A, 9B. During reciprocation of the carriage 38 in the left and right directions 9A, 9B, the recording head 37 ejects ink droplets from the nozzles 36 onto the recording sheet 15 conveyed along the conveyance path 23, to record an image on the recording sheet 15.

In the present embodiment, the image recorder 24 is an ink-jet image recording device but may be an electronic-photographic image recording device, for example.

Controller

A controller, not illustrated, controls operations of the MFP 10 and includes microcomputers and various electronic components. The controller controls the conveying motor to convey the recording sheet 15. Also, the controller controls the image recorder 24 to record an image on the recording sheet 15. The controller is connected to the panel 70 illustrated in FIG. 1 which is provided with a key input device (unit) 50 and a touch screen unit 54. When a user performs an input operation on the key input device 50 or the touch screen unit 54, a signal corresponding to the input operation is transmitted to the controller.

Panel 70

Figure 3A:
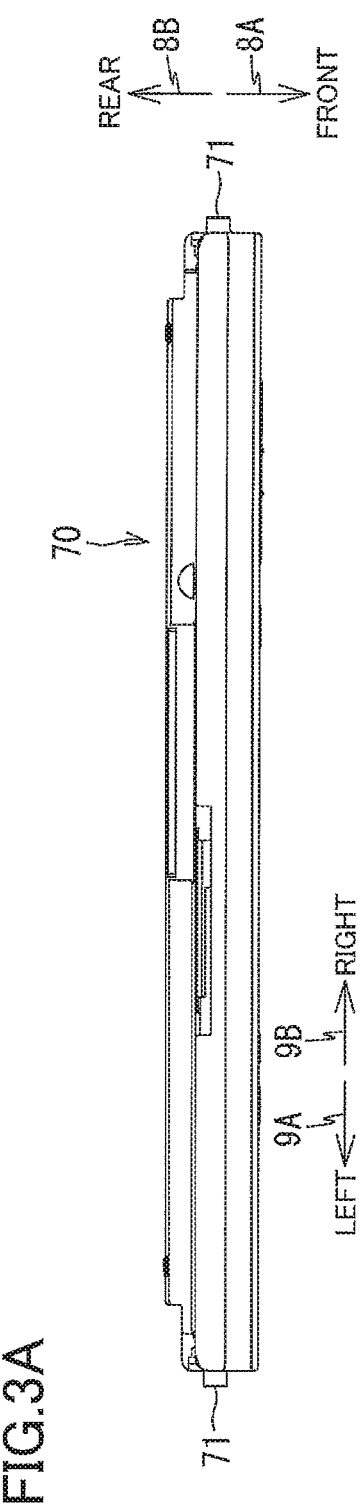
FIG. 3A is a front elevational view of the panel.
Figure 3C:
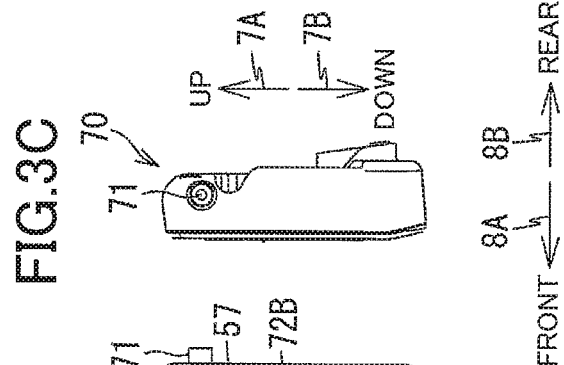
FIG. 3C is a side view of the panel.
Figure 3B:
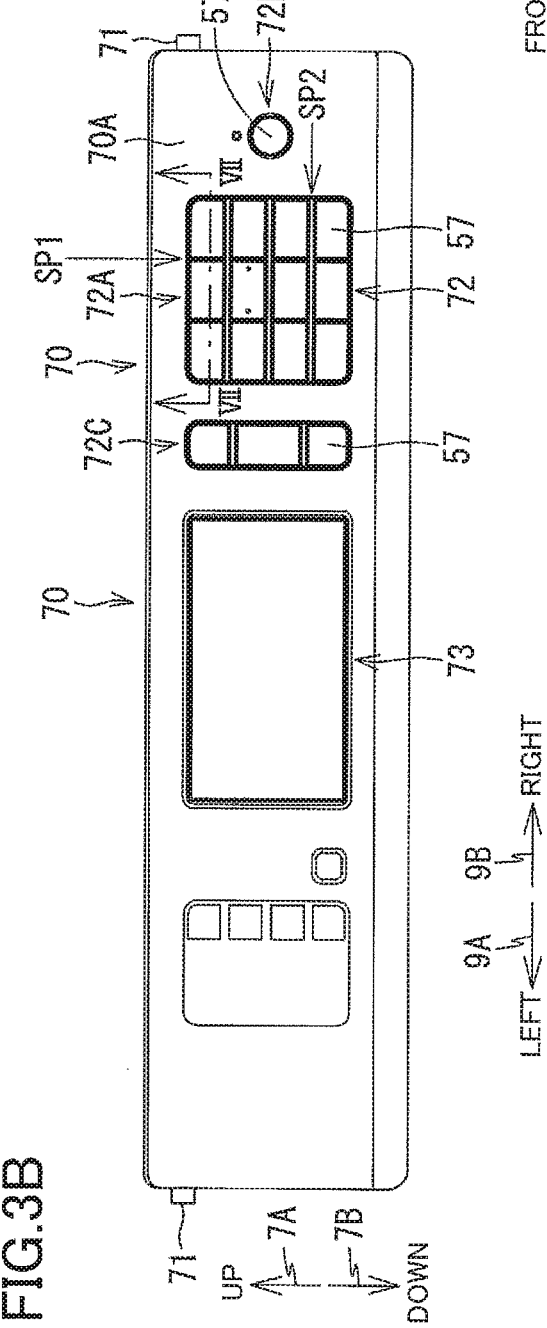
FIG. 3B is a top view of the panel.

As illustrated in FIG. 1, the panel 70 is pivotably supported at its upper end portion by a portion of the printer housing 14 which constitutes the front surface 41. As illustrated in FIGS. 3A-3C, pivot shafts 71 respectively protruding in the left and right directions 9A, 9B are respectively provided on right and left end portions of an upper end portion of the panel 70. That is, the pivot shafts 71 extend in the left and right directions 9A, 9B, respectively. These pivot shafts 71 are respectively fitted in holes, not illustrated, which are formed, in the portion of the printer housing 14 which constitutes the front surface 41, at positions respectively opposed to the pivot shafts 71 in the left and right directions 9A, 9B. This construction enables the panel 70 to pivot about the pivot shafts 71. The panel 70 has a substantially rectangular shape in plan view in which the dimension of the panel 70 in a direction along a pivot axis (in the left and right directions 9A, 9B in the present embodiment) is greater than the dimension of the panel 70 in a direction perpendicular to the pivot axis (in the up and down directions 7A, 7B, for example). The panel 70 also has a flat rectangular parallelepiped shape with a small thickness in the front and rear directions 8A, 8B.

The panel 70 includes: a panel surface member 70A defining a front surface of the panel 70; and a casing 70B provided at the rear of the panel surface member 70A and shaped like a box that is open in its front side. The panel 70 is pivotable about the pivot shafts 71 between the first position illustrated in FIG. 1A and a second position illustrated in FIG. 1B. When located at the first position, a free end (a lower end) of the panel 70 is located nearest to the printer housing 14. At the first position, a surface of the panel surface member 70A extends in the up and down directions 7A, 7B and in the left and right directions 9A, 9B. When located at the second position, the free end is located in front of and above the free end of the panel 70 located at the first position. That is, the free end of the panel 70 is located farther from the printer housing 14 at the second position than at the first position.

Panel Surface Member 70A

Figure 4:
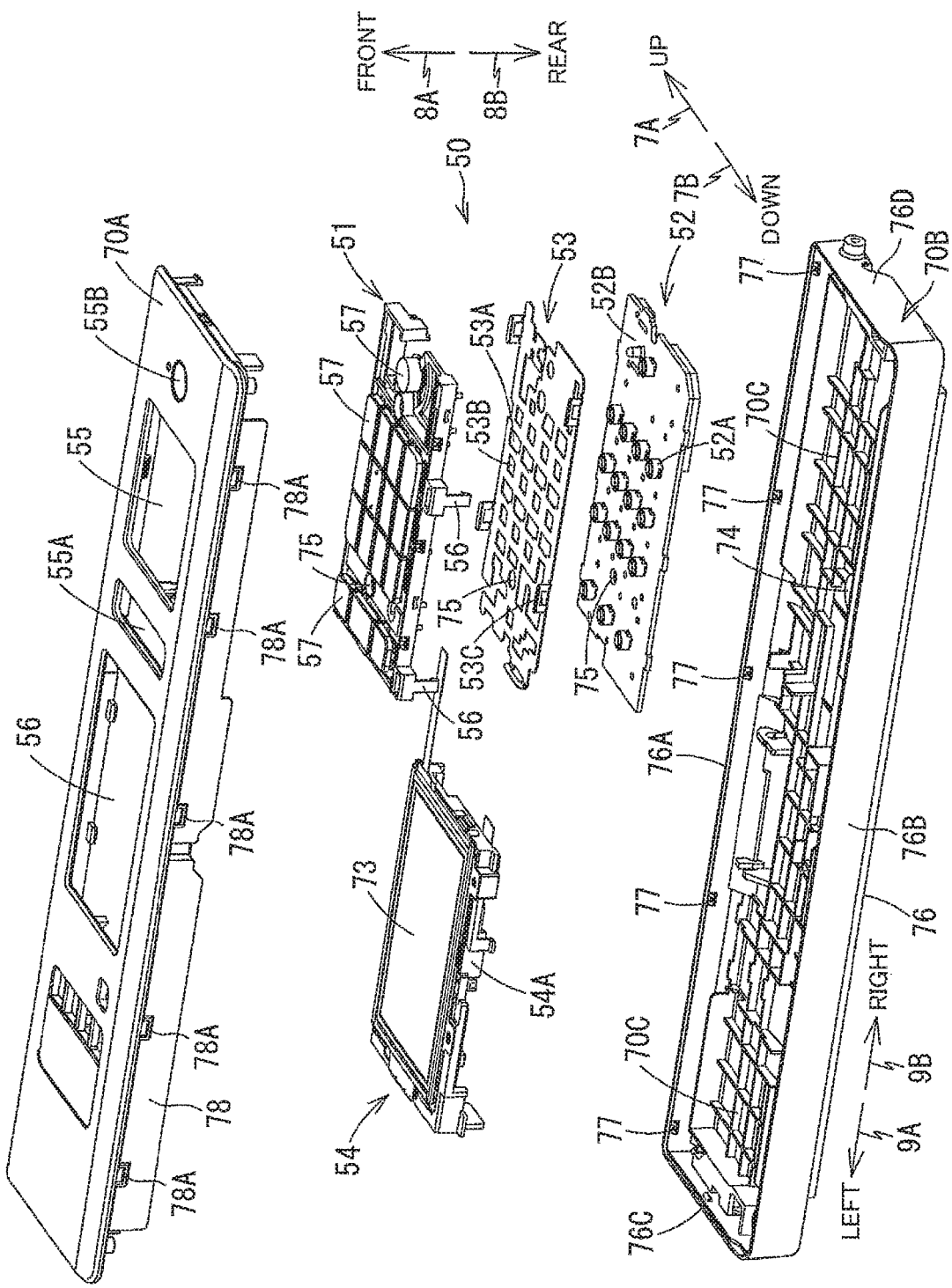
FIG. 4 is an exploded perspective view of the panel.

As illustrated in FIG. 3A, an operation key unit 72 and a touch screen 73 as input devices are provided on the panel surface member 70A of the panel 70. As illustrated in FIG. 4, the panel surface member 70A has openings 55, 55A, 55B corresponding to the operation key unit 72 and has an opening 56 corresponding to the touch screen 73. A pair of plate members 78 protruding in the rear direction 8B are provided respectively on upper and lower end portions of the panel surface member 70A. FIG. 4 illustrates only a lower one of the plate members 78. The pair of plate members 78 are located inside the casing 70B in a state in which the panel surface member 70A is assembled to the casing 70B.

Casing 70B

As illustrated in FIG. 4, a plurality of ribs 70C are arranged on an inner bottom surface, not illustrated, (a rear surface in FIG. 4) of the casing 70B so as to extend in the longitudinal direction and widthwise direction of the casing 70B (in the up and down directions 7A, 7B and the left and right directions 9A, 9B). The plurality of ribs 70C are provided such that their respective front end portions are located at the same height (position) in the front and rear directions 8A, 8B. A boss 74 is provided on a front surface of a substantially rectangular bottom member 76 of the casing 70B. The boss 74 protrudes in the front direction 8A and has a screw hole, not illustrated. The casing 70B includes a first side member 76A, a second side member 76B, a third side member 76C, and a fourth side member 76D provided so as to extend in the front direction 8A from up, down, left, and right ends of the bottom member 76, respectively. Each of the first side member 76A and the second side member 76B is provided with a plurality of engaging members 77 (five engaging members 77 in the present embodiment). In the state in which the panel surface member 70A is assembled to the casing 70B, the first side member 76A and the second side member 76B are respectively opposed to the pair of plate members 78 of the panel surface member 70A. A surface of each of the plate members 78 which is opposed to a corresponding one of the first side member 76A and the second side member 76B is provided with engaged portions 78A at positions corresponding to the respective engaging members 77. When the engaging members 77 are engaged with the respective engaged portions 78A, the panel surface member 70A is secured to the casing 70B in a state in which the opening of the casing 70B is closed by the panel surface member 70A.

Operation Key Unit 72

The panel surface member 70A of the panel 70 is provided with the input devices arranged side by side in the left and right directions 9A, 9B for accepting pressing operations of the user. In the present embodiment, as illustrated in FIG. 3A, the operation key unit 72 and the touch screen 73 are provided on the panel surface member 70A as the input devices. The operation key unit 72 includes a numeric key unit 72A, a power switch key 72B, and a mode key unit 72C.

The operation key unit 72 includes the key input device 50 illustrated in FIG. 4. In the present embodiment, the one operation key unit 72 and the one touch screen 73 are provided, but a plurality of the operation key units 72 and a plurality of the touch screens 73 may be provided. A control circuit board, not illustrated, is integrated in each of the operation key unit 72 and the touch screen 73. The operation key unit 72 includes a plurality of keys 57, and when one of the keys is operated, a processing corresponding to the operated key is executed. The numeric key unit 72A has a function for inputting signals to the control circuit board. The signals indicate numeric values from zero to nine, for example. The power switch key 72B is for turning the MFP 10 on and off. The mode key unit 72C inputs a signal relating to an operation mode of the MFP 10. The keys 57 of the numeric key unit 72A are exposed to an outside through the opening 55 formed in the panel surface member 70A. The key 57 of the power switch key 72B is exposed to an outside through the opening 55B formed in the panel surface member 70A. The keys 57 of the mode key unit 72C are exposed to an outside through the opening 55A formed in the panel surface member 70A.

Touch Screen 73

As illustrated in FIG. 4, the touch screen 73 includes the touch screen unit 54. The touch screen unit 54 includes: the touch screen 73; a supporter 54A for supporting the touch screen 73; and a driving device, not illustrated, for driving the touch screen 73. The touch screen 73 includes a liquid crystal display and a location input device, not illustrated. The controller controls the touch screen 73 to display an instruction for the user and information relating to image recording, for example. That is, the controller controls the touch screen 73 to perform a display operation for displaying a state of the MFP 10 and the information relating to image recording, for example. The information displayed on the touch screen 73 helps the user to press one of the operation key unit 72 and an image displayed on the touch screen 73 to instruct the MFP 10 to perform image recording, for example. Each of the operation key unit 72 and the touch screen 73 outputs a signal to the controller based on the pressing operation. That is, each of the operation key unit 72 and the touch screen 73 accepts a pressing operation. When image recording is instructed by the controller, the image recorder 24 performs the image recording. That is, the image recorder 24 records an image on the recording sheet 15 based on an operation on the operation key unit 72 and the touch screen 73. The touch screen 73 is exposed to an outside through the opening 56 formed in the panel surface member 70A.

Key Input Device 50

Figure 5:
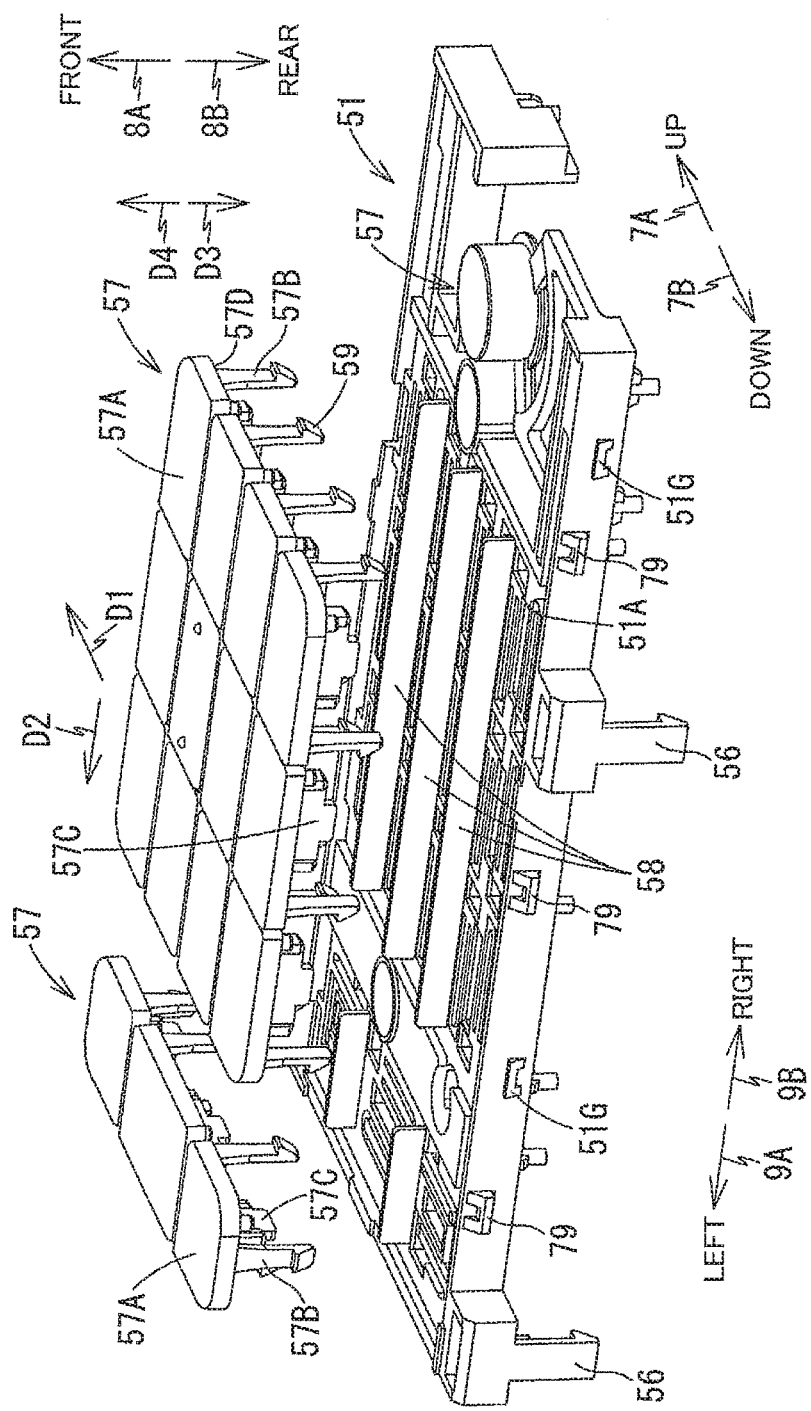
FIG. 5 is a perspective view of a holder and a plurality of keys.

As illustrated in FIG. 4, the key input device 50 includes: a holder 51 shaped like a sheet or a plate; a circuit board 52; a conductive member 53 shaped like a sheet; and the keys 57. As illustrated in FIG. 3A, the numeric key unit 72A includes the twelve keys 57 arranged in a 4×3 matrix in which three keys 57 are arranged in the left and right directions 9A, 9B, and four keys 57 are arranged in the up and down directions 7A, 7B. As illustrated in FIG. 5, the up direction 7A is one example of a first direction D1, and the left direction 9A is one example of a second direction D2. The left and right directions 9A, 9B are one example of a horizontal direction. A distance between the keys 57 in the left and right directions 9A, 9B is 0.5 mm. Specifically, a distance between surfaces of ends of respective adjacent two of the keys 57 in the left and right directions 9A, 9B is 0.5 mm. This distance is one example of a first distance SP1. A distance between the keys 57 in the up and down directions 7A, 7B is greater than the distance between the keys 57 in the left and right directions 9A, 9B. Specifically, a distance between surfaces of ends of respective adjacent two of the keys 57 in the up and down directions 7A, 7B is greater than the distance between the keys 57 in the left and right directions 9A, 9B. The distance between the keys 57 in the up and down directions 7A, 7B is one example of a second distance SP2. A screw, not illustrated, is fitted into the screw hole of the boss 74 provided on the casing 70B, from a rear side of the casing 70B, whereby the key input device 50 is secured to the panel 70. The screw is engaged with a screw receiving portion, not illustrated, formed in a rear surface of the panel 70, through screw holes 75 respectively formed in the circuit board 52, the conductive member 53, and the holder 51. A bottom surface of the key input device 50 (i.e., a rear surface of the circuit board 52) is held in contact with front end portions of the ribs 70C provided on the casing 70B, whereby the key input device 50 is positioned in the front and rear directions 8A, 8B in the panel 70.

The power switch key 72B is one of the keys 57 which has a round shape. The mode key unit 72C includes the three keys 57 arranged in the up and down directions 7A, 7B. As illustrated in FIG. 4, the one opening 55 is formed in the panel surface member 70A so as to correspond to the twelve keys 57 of the numeric key unit 72A. Pressing surfaces 57A of the respective twelve keys 57 of the numeric key unit 72A are exposed to an outside through the opening 55 formed in the panel surface member 70A. The three keys 57 of the mode key unit 72C are exposed to an outside through the opening 55A formed in the panel surface member 70A at a position located to the left of the opening 55. The key 57 of the power switch key 72B is exposed to an outside through the round opening 55B formed in the panel surface member 70A at a position located to the right of the opening 55.

Keys 57

Figure 7:
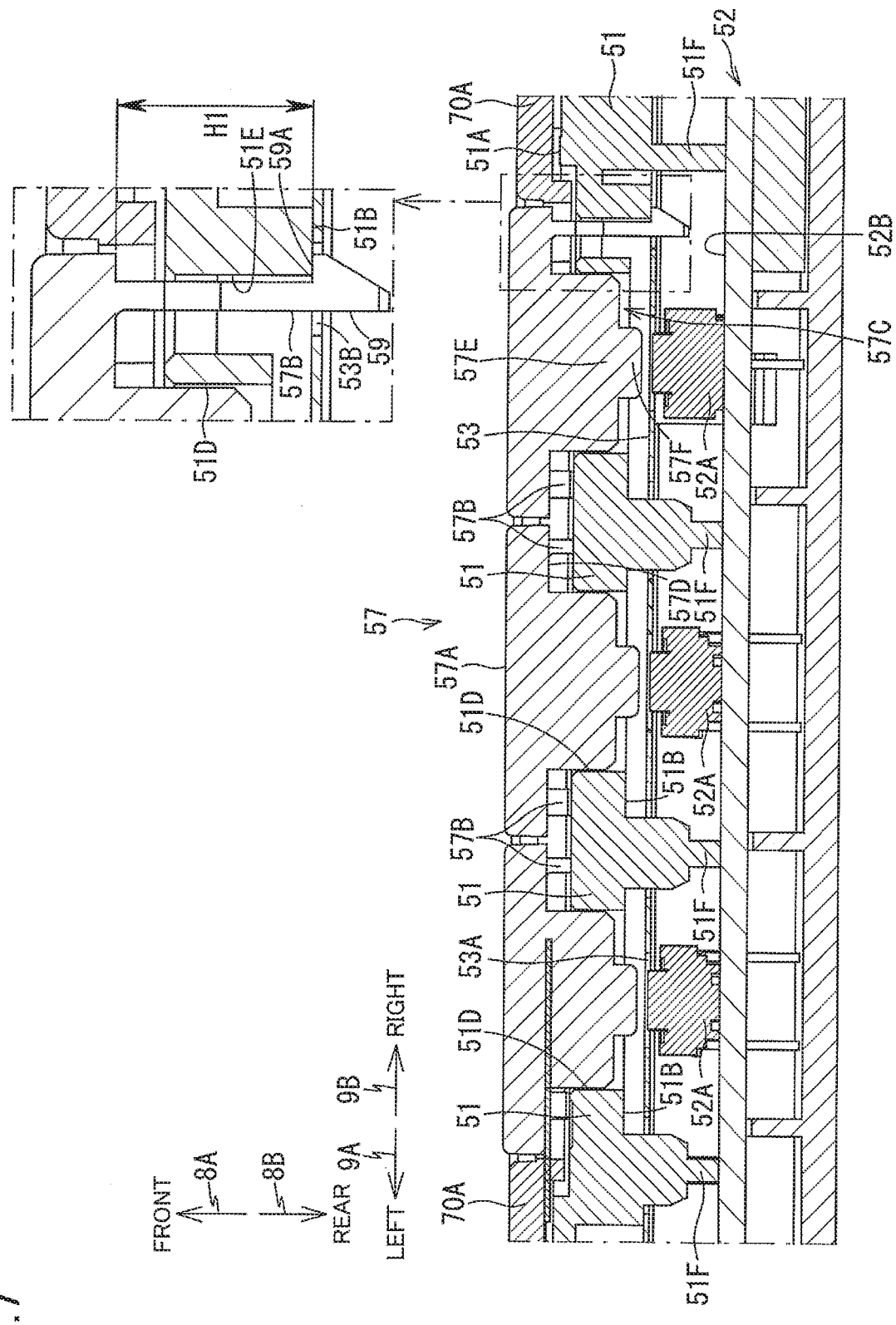
FIG. 7 is a cross-sectional view of a key input device taken along line VII-VII in FIG. 3A.

As illustrated in FIG. 5, each of the keys 57 includes: the pressing surface 57A as a key top; and shafts 57B and a contact portion 57C provided on a back surface 57D of the key 57 so as to protrude in the rear direction 8B. Each of the shafts 57B has an engaging portion 59 at its distal end portion. As illustrated in FIG. 7, the engaging portion 59 is shaped like a hook and has a contact surface 59A at a position spaced apart from the back surface 57D at a first distance H1. The contact surface 59A is contactable with a second surface 51B of the holder 51. Switches 52A are provided on the circuit board 52. The contact portion 57C of each key 57 is disposed so as to be opposed to a corresponding one of the switches 52A. When the pressing surface 57A of the key 57 is pressed down, the contact portion 57C is in contact with the switch 52A. Images, not illustrated, are printable on the pressing surfaces 57A of the respective keys 57. Examples of the images include numbers (e.g., "3"), characters (e.g., "A"), and signs (e.g., "#"). These images may be printed on the respective keys 57 in a state in which all the keys 57 of the numeric key unit 72A are mounted on the holder 51, for example. The keys 57 may be formed of ABS resin, for example.

Holder 51

Figure 6:
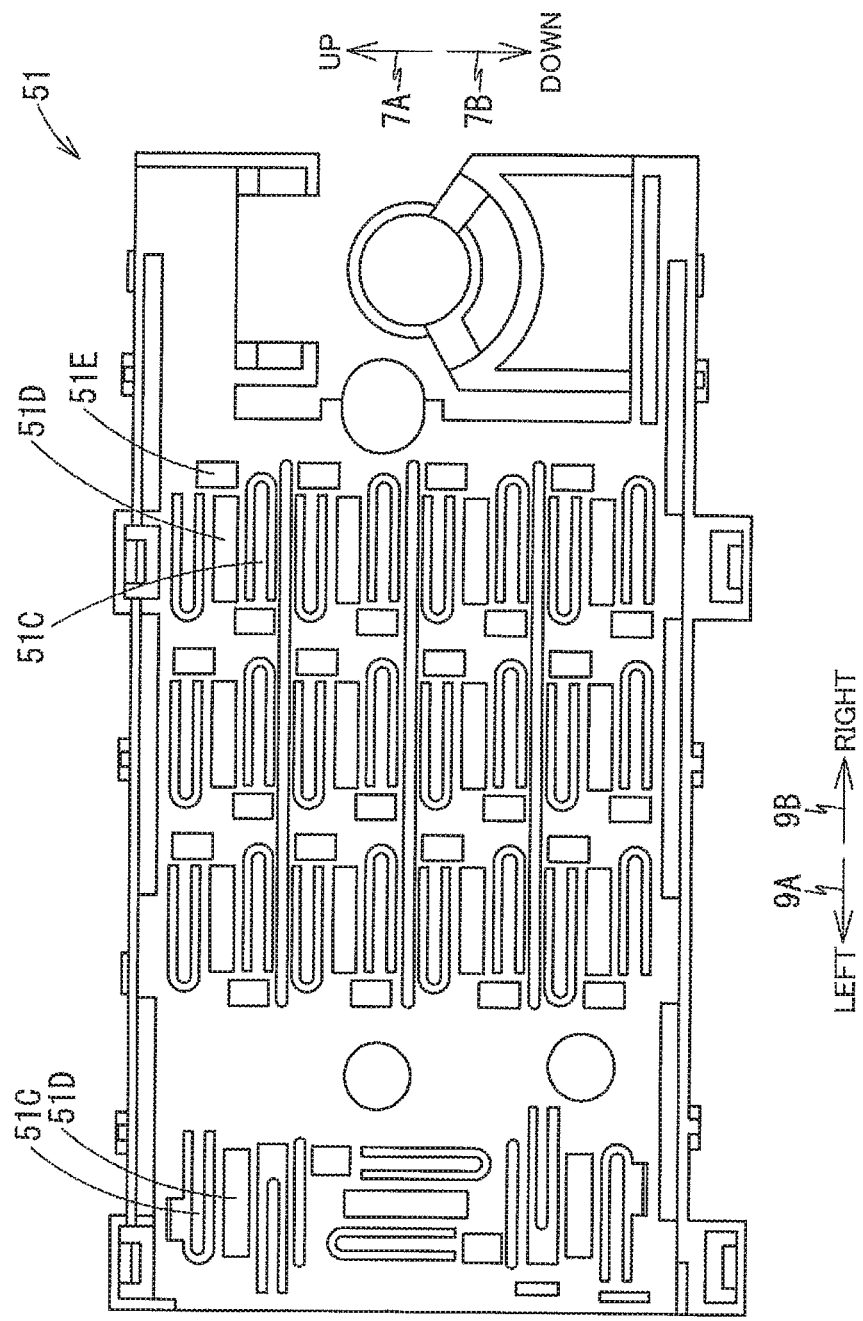
FIG. 6 is a plan view of the holder.

The holder 51 is formed of resin, for example. As illustrated in FIG. 5, the holder 51 has (i) a first surface 51A on which the keys 57 are arranged and (ii) the second surface 51B (see FIG. 7) that is a back side of the holder 51 from the first surface 51A. As illustrated in FIG. 6, urging members 51C are provided on the holder 51 at positions each corresponding to one of the keys 57. The holder 51 has through holes 51D (each as one example of a first through hole) at positions respectively corresponding to the contact portions 57C of the respective keys 57. The contact portions 57C are inserted into the respective through holes 51D. Each of the through holes 51D has a substantially rectangular shape elongated in the left and right directions 9A, 9B. The holder 51 has through holes 51E (each as one example of a third through hole) at positions respectively corresponding to the shafts 57B of the respective keys 57. The shafts 57B are inserted into the respective through holes 51E. Each of the through holes 51E has a rectangular shape elongated in the up and down directions 7A, 7B. Ribs 58 extending in the left and right directions 9A, 9B are arranged on the first surface 51A of the holder 51 at positions each between adjacent two of the keys 57 in the up and down directions 7A, 7B.

As illustrated in FIG. 7, ribs 51F protruding in the rear direction 8B are provided on a rear end portion of the holder 51. Distal end portions of the respective ribs 51F contact a switch surface 52B of the circuit board 52 to position the circuit board 52 with respect to the holder 51. The holder 51 may be formed of ABS resin, for example. The holder 51 has two hooks 56 extending in the rear direction 8B from each of upper and lower end portions of the holder 51. The hooks 56 are respectively engaged with upper and lower ends of the circuit board 52. This engagement secures the circuit board 52 to the holder 51 in a state in which the conductive member 53 is interposed therebetween. As a result, the holder 51, the circuit board 52, and the conductive member 53 constitute the key input device 50. A plurality of engaging members 79 (three engaging members 79 in FIG. 5) are provided on each of the upper and lower end portions of the holder 51. The engaging members 79 are respectively engaged with engaged portions, not illustrated, provided on the plate members 78 provided on the panel surface member 70A.

Urging Members 51C

As illustrated in FIG. 6, the urging members 51C are provided integrally with the holder 51. Each of the urging members 51C has opposite end portions: a fixed end portion fixed to the holder 51 and a free end portion. Each of the urging members 51C is a leaf spring extending in a straight line in the left and right directions 9A, 9B. The free end portion of each urging member 51C has a protrusion, not illustrated, that protrudes in the front direction 8A and that contacts the back surface 57D of the corresponding key 57. The urging member 51C is in contact with the back surface 57D of the key 57 in a state in which the protrusion of the free end portion is located at the rear of the protrusion of the free end portion of the urging member 51C in its natural state (in which the urging member 51C is not compressed). In this state, the urging member 51C urges the key 57 in the front direction 8A. The front direction 8A is one example of a fourth direction D4 as illustrated in FIG. 5.

Contact Portion 57C

As illustrated in FIG. 7, a front portion of the contact portion 57C of each key 57 has a base 57E held in contact with the back surface 57D and having a generally rectangular shape in traverse cross section. Each base 57E is to be fitted (inserted) in a corresponding one of the through holes 51D of the holder 51. Outer side surfaces of the base 57E come in sliding contact with respective inner side surfaces of the through hole 51D in a state in which the based 57E is fitted in the through hole 51D, whereby the base 57E guides movement of the key 57 in the front and rear directions 8A, 8B. In view of the above, each of the through holes 51D is one example of a supporter that supports the key 57 movably in the front and rear directions 8A, 8B. The rear direction 8B is one example of a third direction D3 as illustrated in FIG. 5. A rear end surface of the base 57E is provided with a protruding end portion 57F having a round shape in transverse cross section. When the pressing surface 57A of the key 57 is pressed, the protruding end portion 57F is brought into contact with the switch 52A corresponding to the key 57 to change the state of the switch 52A.

Shafts 57B

A plurality of the shafts 57B, e.g., the two shafts 57B, protrude from the back surface 57D of each key 57 in the rear direction 8B so as to extend in a direction perpendicular to the back surface 57D. Each of the shafts 57B may be provided such that its left side surface or its right side surface can be in sliding contact with an inner side surface of a corresponding one of the through holes 51E of the holder 51 to guide movement of the key 57 in the front and rear directions 8A, 8B. Each of the engaging portions 59 provided or the rear end portions of the respective shafts 57B protrudes in a hook shape in the left direction 9A on the right direction 9B. A front end surface of the hook portion serves as the contact surface 59A that contacts the second surface 51B of the holder 51.

Ribs 58

Each of the ribs 58 is a rectangular plate member having the thickness substantially equal to the distance between the keys 57 in the up and down directions 7A, 7B. A position of a front end surface of each rib 58 in the front and rear directions 8A, 8B is the same as that of the pressing surfaces 57A in a state in which the pressing surfaces 57A are not pressed, or a position nearer to the first surface 51A than the position of the pressing surfaces 57A in the state in which the pressing surfaces 57A are not pressed.

Circuit Board 52

The circuit board 52 has the switch surface 52B on which the switches 52A corresponding to the respective keys 57 are provided. The circuit board 52 is secured to the holder 51 by the hooks 56 provided on the upper and lower end portions of the holder 51. As a result, the circuit board 52 is held by the holder 51 in a stacked manner in a state in which the switch surface 52B is opposed to the second surface 51B of the holder 51. The circuit board 52 has a function of outputting a signal in accordance with a state of each switch 52A.

Conductive Member 53

The conductive member 53 is a sheet-like member disposed between the holder 51 and the circuit board 52. The conductive member 53 has (i) through holes 53A (each as one example of a second through hole) in which top portions of the switches 52A are to be respectively inserted and (ii) through holes 53B (each as one example of a fourth through hole) in which the engaging portions 59 of the keys 57 are to be respectively inserted. For each of the keys 57, the shaft 57B is also inserted in the through hole 53B in the state in which the pressing surface 57A is pressed. Also, in the state in which the pressing surface 57A of the key 57 is not pressed, as illustrated in FIG. 7, the base 57E and the protruding end portion 57F of the contact portion 57C are inserted in the through hole 51D, and the switch 52A is inserted in the through hole 53A. However, in the state in which the pressing surface 57A of the key 57 is not pressed, the contact portion 57C and the switch 52A may be inserted in the through hole 51D, and only the switch 52A may be inserted in the through hole 51D. In the state in which the key 57 is pressed, only the contact portion 57C may be inserted in the through hole 51D and the through hole 53A. Alternatively, the MFP 10 may be configured such that the contact portion 57C is inserted in the through hole 51D and the through hole 53A, and the switch 52A is inserted in the through hole 53A in the state in which the key 57 is pressed. A plurality of engaging members 53C are provided on each of upper and lower end portions of the conductive member 53 so as to extend in the front direction 8A. The engaging members 53C are respectively engaged with engaged portions 51G which are formed in each of the upper and lower end portions of the holder 51 at positions corresponding to the respective engaging members 53C. When the engaging members 53C are respectively engaged with the engaged portions 51G the conductive member 53 is secured to the holder 51, with the conductive member 53 interposed between the holder 51 and the circuit board 52.

Method of Manufacturing Key Input Device 50

A method of manufacturing the key input device 50 includes Steps 1-4. At Step 1, the keys 57 of the numeric key unit 72A are prepared. At Step 2, the holder 51 is prepared. At Step 3, each of the shafts 57B of the keys 57 prepared at Step 1 is inserted into the corresponding one of the through holes 51D of the holder 51 prepared at Step 2, whereby the contact surface 59A of the engaging portion 59 of the shaft 57B is brought into contact with the second surface 51B of the holder 51. As a result, all the keys 57 of the numeric key unit 72A are mounted on the holder 51. At Step 4, a printing device, not illustrated, prints images on the pressing surfaces 57A of the respective keys 57 mounted on the holder 51 at Step 3.

Effects

In the key input device 50 according to the above-described embodiment, the key input device 50 as a key input device is constituted by (i) the keys 57 held by the holder 51 and (ii) the circuit board 52 and the conductive member 53 held by the holder 51 in the stacked manner. The key input device 50 is mounted on the panel 70 in the state in which the numeric key unit 72A is exposed through the opening 55 formed in the panel surface member 70A of the panel 70, whereby a numeric keypad of a user interface is provided. Accordingly, the key input device 50 has a good design, enables easy assembling of the antistatic key input device to the panel 70, and enables easier manufacturing of the panel 70.

In the method of manufacturing the key input device 50 according to the above-described embodiment, also in the case where the numeric key unit 72A includes a plurality of the keys 57 having the same shape, it is possible to prevent the keys 57 respectively having the printed pressing surfaces 57A from being arranged in a layout different from a designed layout. Accordingly, in the case where the image-printed keys 57 are held by the holder 51, an inspecting step is required for inspecting whether the keys 57 are misarranged, but the configuration in the above-described embodiment does not require the inspecting step, which simplifies a process of manufacturing the key input device 50, resulting in reduced manufacturing cost. Also, it is possible to increase yield with reduction in defective components.

The key input device 50 includes the ribs 58 each disposed between corresponding adjacent two of the keys 57 in at least one of the first direction and the second direction.

In the above-described construction, in the case where the plurality of keys 57 are collectively exposed through the single opening 55 formed in the panel surface member 70A, for example, each of the ribs 58 can be disposed between corresponding adjacent two of the keys 57 in at least one of the first direction and the second direction. With this construction, in the case where the distance between the keys 57 in at least one of the first direction and the second direction is preferably increased from the viewpoint of design, it is possible to prevent a construction under the keys 57 from being viewed from spaces between the keys 57, without covering the spaces between the keys 57 with a surface member, by increasing the distance between the keys 57 in the at least one of the first direction and the second direction and by arranging the ribs 58 between the keys 57 in the at least one of the first direction and the second direction. As a result, a user interface having a desired design can be easily obtained. Also, the ribs 58 provided on the holder 51 can increase the key input device 50 in strength.

In the key input device 50, the keys 57 are arranged in the first direction and the second direction, and the distance between each adjacent two of the keys 57 in at least one of the first direction and the second direction is less than or equal to 0.51 mm.

With this construction, in the case where the keys 57 are arranged in matrix in, e.g., the numeric keypad, the distance between the keys 57 in one direction can be greatly reduced when compared with the conventional key distance. As a result, the user interface can be provided with an advanced design.

In the key input device 50, the first direction coincides with the horizontal direction. The first distance between the keys 57 in the first direction is less than or equal to 0.51 mm. The second distance between the keys 57 in the second direction is greater than the first distance. The ribs 58 are arranged between the keys 57 arranged in the second direction.

In this construction, when viewed by the user who performs key entry, for example, the first distance between the keys 57 in the left and right directions 9A, 9B is considerably small, and the second distance between the keys 57 in the front and rear directions 8A, 8B or the up and down directions 7A, 7B is greater than the first distance. The ribs 58 are arranged between the keys 47 in the second direction, thereby preventing the construction under the keys 57 from being viewed from an outside. Also, since the ribs 58 are arranged between the keys 57 arranged in the second direction, it is possible to reduce errors in pressing of the keys 57, also in the case where the dimension of the key 57 in the second direction (in the lengthwise direction) is made smaller than the dimension of the key 57 in the first direction (the widthwise direction) for design, for example. This construction facilitates advanced designing of the keys 57. It is noted that since the dimension of the key 57 is large in the first direction in which the key distance is small, errors in pressing of the keys 57 can be reduced.

In the key input device 50, the shafts 57B are provided on the back surface 57D of each of the keys 57 so as to protrude from the back surface 57D and extend in the direction perpendicular to the back surface 57D. The through holes 51E corresponding to the respective shafts 57B are formed in the holder 51, and the shafts 57B are insertable into the respective through holes 51E. Each of the shafts 57B has the engaging portion 59 at a position spaced apart from the back surface 57D of the key 57 at the first distance. The engaging portion 59 is contactable with the second surface 51B of the holder 51 in the state in which the shaft 57B is inserted in the through hole 51E. The engaging portion 59 engages the key 57 with the holder 51 against the urging force of the urging members 51C.

In this construction, each of the two shafts 57B protrudes from the back surface 57D of the key 57 so as to be inserted in the corresponding through hole 51E formed in the holder 51. The engaging portion 59 provided on the shaft 57B at the position spaced apart from the back surface 57D of the key 57 at the first distance is held in contact with the second surface 51B of the holder 51. With this construction, the keys 57 urged by the urging force of the urging members 51C in the fourth direction are held by the holder 51 at the fixed height with respect to the second surface 51B of the holder 51 in a normal state in which each key 57 is not pressed. Thus, the heights of the pressing surfaces of the respective keys 57 can be easily made uniform in the normal state, which facilitates improvement of the design of the key input device. Since the keys 57 are engaged with the holder 51 by the shafts 57B and the engaging portions 59, the back surfaces 57D of the keys 57 are easily held in parallel with the first surface of the holder 51 in the normal state. Accordingly, the keys 57 can easily be arranged in matrix in an orderly way.

The conductive member 53 has the through holes 53B in which the engaging portions 59 of the respective keys 57 are to be inserted.

With this construction, also in the case where the shafts 57B are made long enough for enough stroke of the keys 57 or in the case where the distance between the holder 51 and the conductive member 53 is small, it is possible to prevent the engaging portion 59 from interfering with the conductive member 53 in response to pressing of the key 57. This construction can easily reduce the thickness of the key input device 50 and the size of the key input device 50.

The key input device 50 includes: a first resin molded object including at least one of the holder 51, the through hole 51D, the urging member 51C, and the rib 58; and a second resin molded object including at least one of the keys 57, the contact portion 57C, the shaft 57B, and the engaging portion 59.

In this construction, at least one of the through holes 51D, the urging members 51C, and the ribs 58 can be provided on the holder 51 by integral molding. Thus, the key input device 50 can be easily manufactured. Also, at least one of the contact portions 57C, the shafts 57B, and the engaging portion 59 can be provided on the key 57 by integral molding.

In the key input device 50, at least one of the first resin molded object and the second resin molded object is formed of ABS resin.

With this construction, the first resin molded object is formed of ABS resin having impact resistance and high stiffness, for example. This construction can improve the toughness of the key input device 50, keep enough resilience against pressing of the key 57 for a long time, and provide a good feeling of operation without rattling.

The holder 51 holds the ten or more keys 57 in the key input device 50.

In the above-described construction, the key input device 50 can be constructed so as to include the multiplicity of the keys 57 required for operations on the key input device 50 such as the numeric keypad and the power key. This construction can reduce the number of components of various devices, facilitating assembly of the various devices.

The image recording apparatus includes the key input device 50 and the image recorder 24 configured to record an image on the sheet.

In the present disclosure, it is possible to eliminate limitations to designs due to external factors such as mechanical strength of the surface member of the user interface. Also, it is possible to improve (i) the mountability of the key input device 50 on a device using the key input device 50 as a user interface and (ii) resistance to electrostatic destruction of circuit components of the key input device.

Modifications

In the above-described embodiment, the top portions of the switches 52A are inserted in the respective through holes 53A of the conductive member 53, but the present disclosure is not limited to this construction. For example, the contact portions 57C may be inserted in the respective through holes 53A instead of the switches 52A.

It is not essential that the conductive member 53 has the through holes 53B. For example, the through holes 53B may be omitted in the case where the distance between the holder 51 and the conductive member 53 is large or in the case where the stroke of the key 57 is short.

The urging members 51C need not be provided integrally with the holder 51 and may be provided by mounting coil springs on the holder 51, for example. The ribs 58 need not be provided integrally with the holder 51 either, and metal plate members may be mounted on the holder 51 for improved design.

Also, each of the contact portions 57C, the shafts 57B, and the engaging portions 59 of the keys 57 may be provided by mounting an independent member on the back surface 57D of the key 57.

In manufacturing of the key input device 50, images may be printed on the pressing surfaces 57A of the respective keys 57 before the keys 57 are held by the holder 51. In this case, however, the step of manufacturing the key input device 50 preferably includes the step of inspecting whether the keys 57 are misarranged.

What is claimed is:

1. A key input device, comprising:
a plurality of keys each comprising (i) a pressing surface, (ii) a back surface located on an opposite side of said each of the plurality of keys from the pressing surface, and (iii) a contact portion provided on the back surface;
a holder having a sheet shape and comprising an urging member configured to urge at least one of the plurality of keys in a fourth direction that is opposite to a third direction directed from the pressing surface toward the back surface, the holder comprising a first surface and a second surface located on an opposite side of the holder from the first surface, the holder holding the plurality of keys, such that the plurality of keys are movable in the third direction and the fourth direction, in a state in which the plurality of keys are arranged on the first surface in at least one of a first direction parallel with the first surface and a second direction parallel with the first surface and intersecting the first direction;
a conductive member having a sheet shape and opposed to the second surface of the holder; and
a circuit board comprising a switch surface and a plurality of switches arranged on the switch surface and each being a switch contactable with the contact portion of a corresponding one of the plurality of keys, the circuit board being disposed such that the conductive member is interposed between the switch surface and the second surface of the holder,
wherein the holder comprises a plurality of first through holes, and the conductive member comprises a plurality of second through holes, and
wherein at least one of the contact portion and the switch is inserted in a corresponding one first through hole of the plurality of first through holes, and at least one of the contact portion and the switch is inserted in a corresponding one second through hole of the plurality of second through holes.

2. The key input device according to claim 1, wherein when each of the plurality of keys is not pressed, the contact portion is inserted in the corresponding one first through hole formed in the holder, and the switch is inserted in the corresponding one second through hole formed in the conductive member.

3. The key input device according to claim 1, wherein when each of the plurality of keys is pressed, the contact portion is inserted in the corresponding one first through hole and the corresponding one second through hole, and the switch is inserted in the corresponding one second through hole.

4. The key input device according to claim 1,
wherein the plurality of keys are arranged in the first direction and the second direction, and
wherein the plurality of keys comprise two keys adjacent to each other in at least one of the first direction and the second direction, and a distance between the two keys is less than or equal to 0.51 mm.

5. The key input device according to claim 1, wherein the holder is configured to hold at least ten keys as the plurality of keys.

6. The key input device according to claim 1, further comprising a rib disposed between two keys of the plurality of keys, the two keys being adjacent to each other in at least one of the first direction and the second direction.

7. The key input device according to claim 6,
wherein the first direction is directed along a horizontal direction,
wherein the plurality of keys comprise two keys adjacent to each other in the first direction and two keys adjacent to each other in the second direction,
wherein a distance between the two keys adjacent to each other in the first direction is less than or equal to a first distance of 0.51 mm,
wherein a distance between the two keys adjacent to each other in the second direction is greater than the first distance, and
wherein the rib is disposed between the two keys adjacent to each other in the second direction.

8. The key input device according to claim 6,
wherein each of the plurality of keys comprises at least one shaft protruding from the back surface toward the holder,
wherein the holder comprises a plurality of third through holes in each of which a corresponding one of the at least one shaft is inserted, and
wherein each of the at least one shaft comprises an engaging portion that is held in contact with the second surface of the holder by an urging force of the urging member to engage the shaft with the holder in a state in which the shaft is inserted in the third through hole.

9. The key input device according to claim 8, wherein the conductive member comprises a plurality of fourth through holes in each of which the engaging portion of a corresponding one of the at least one shaft is inserted.

10. The key input device according to claim 8, further comprises:
a first resin molded object comprising at least one of the holder, the urging member, and the rib; and
a second resin molded object comprising at least one of the contact portion, the at least one shaft, the engaging portion, and one of the plurality of keys.

11. The key input device according to claim 10, wherein at least one of the first resin molded object and the second resin molded object is formed mainly of ABS resin.

12. An image recording apparatus, comprising:
a plurality of keys each comprising (i) a pressing surface, (ii) a back surface located on an opposite side of said each of the plurality of keys from the pressing surface, and (iii) a contact portion provided on the back surface;
a holder having a sheet shape and comprising an urging member configured to urge at least one of the plurality of keys in a fourth direction that is opposite to a third direction directed from the pressing surface toward the back surface, the holder comprising a first surface and a second surface located on an opposite side of the holder from the first surface, the holder holding the plurality of keys, such that the plurality of keys are movable in the third direction and the fourth direction, in a state in which the plurality of keys are arranged on the first surface in at least one of a first direction parallel with the first surface and a second direction parallel with the first surface and intersecting the first direction;
a conductive member having a sheet shape and opposed to the second surface of the holder;
a circuit board comprising a switch surface and a plurality of switches arranged on the switch surface and each being a switch contactable with the contact portion of a corresponding one of the plurality of keys, the circuit board being disposed such that the conductive member is interposed between the switch surface and the second surface of the holder; and
an image recorder configured to record an image on a sheet, wherein the holder comprises a plurality of first through holes, and the conductive member comprises a plurality of second through holes, and wherein at least one of the contact portion and the switch is inserted in a corresponding one first through hole of the plurality of first through holes, and at least one of the contact portion and the switch is inserted in a corresponding one second through hole of the plurality of second through holes.

13. A method of manufacturing a key input device, the key input device comprising:

a plurality of keys each comprising (i) a pressing surface, (ii) a back surface located on an opposite side of said each of the plurality of keys from the pressing surface, and (iii) a contact portion provided on the back surface;

a holder having a sheet shape and comprising an urging member configured to urge at least one of the plurality of keys in a fourth direction that is opposite to a third direction directed from the pressing surface toward the back surface, the holder comprising a first surface and a second surface located on an opposite side of the holder from the first surface, the holder holding the plurality of keys, such that the plurality of keys are movable in the third direction and the fourth direction, in a state in which the plurality of keys are arranged on the first surface in at least one of a first direction parallel with the first surface and a second direction parallel with the first surface and intersecting the first direction;

a conductive member having a sheet shape and opposed to the second surface of the holder; and a circuit board comprising a switch surface and a plurality of switches arranged on the switch surface and each being a switch contactable with the contact portion of a corresponding one of the plurality of keys, the circuit board being disposed such that the conductive member is interposed between the switch surface and the second surface of the holder, wherein the holder comprises a plurality of first through holes, and the conductive member comprises a plurality of second through holes, wherein at least one of the contact portion and the switch is inserted in a corresponding one first through hole of the plurality of first through holes, and at least one of the contact portion and the switch is inserted in a corresponding one second through hole of the plurality of second through holes, and wherein the method of manufacturing the key input device comprises recording an image on the pressing surface in a state in which the plurality of keys are held by the holder.

* * * * *